(12) United States Patent
Bergsten et al.

(10) Patent No.: US 9,829,773 B2
(45) Date of Patent: Nov. 28, 2017

(54) MONITORING DEVICE ARRANGEMENT

(71) Applicant: Axis AB, Lund (SE)

(72) Inventors: Johan Bergsten, Landskrona (SE); Jens Pahlitzsch, Lund (SE); Niclas Moller Lewin, Malmo (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/291,813

(22) Filed: Oct. 12, 2016

(65) Prior Publication Data
US 2017/0031234 A1 Feb. 2, 2017

Related U.S. Application Data

(63) Continuation of application No. 14/567,563, filed on Dec. 11, 2014, now Pat. No. 9,535,311.

(30) Foreign Application Priority Data

Dec. 19, 2013 (EP) .................... 13198392

(51) Int. Cl.
*G03B 17/00* (2006.01)
*G03B 17/56* (2006.01)
*G08B 13/196* (2006.01)
*F16M 13/02* (2006.01)

(52) U.S. Cl.
CPC ......... *G03B 17/561* (2013.01); *F16M 13/022* (2013.01); *G08B 13/19623* (2013.01)

(58) Field of Classification Search
USPC .................................. 248/683, 206.5, 309.4
See application file for complete search history.

(56) References Cited

U.S. PATENT DOCUMENTS

| 3,286,212 A * | 11/1966 | Thompson ............. F16M 11/02 248/187.1 |
| 3,819,141 A | 6/1974 | Mori |
| 4,080,629 A | 3/1978 | Hammond et al. |
| 4,157,858 A | 6/1979 | Debaigt |
| 4,341,452 A | 7/1982 | Korling |

(Continued)

FOREIGN PATENT DOCUMENTS

| EP | 2077538 A1 | 7/2009 |
| FR | 2603759 | 10/1988 |

(Continued)

OTHER PUBLICATIONS

Viseum IMC System Architecture product literature (downloaded Nov. 13, 2013).

(Continued)

*Primary Examiner* — Terrell McKinnon
*Assistant Examiner* — Michael McDuffie
(74) *Attorney, Agent, or Firm* — Snyder, Clark, Lesch & Chung, LLP

(57) ABSTRACT

A monitoring device arrangement is disclosed that may comprise a mounting rail and at least two fixed monitoring devices. The fixed monitoring devices may each being mounted on a respective holder. The holders may be arranged on the mounting rail. Each holder may include a lock device that locks the holder in a determined position on the mounting rail. The lock device may be releasable to allow sliding repositioning of the holder on the mounting rail.

20 Claims, 6 Drawing Sheets

(56) References Cited

U.S. PATENT DOCUMENTS

| | | | |
|---|---|---|---|
| 4,945,367 A | 7/1990 | Blackshear | |
| 5,023,725 A | 6/1991 | McCutchen | |
| 5,095,325 A * | 3/1992 | Carstens | G03B 15/05 248/309.1 |
| 5,240,220 A | 8/1993 | Elberbaum | |
| 6,064,430 A | 5/2000 | Lefkowitz | |
| 6,354,749 B1 | 3/2002 | Pfaffenberger | |
| 7,298,969 B2 | 11/2007 | Elberbaum | |
| 7,740,214 B2 * | 6/2010 | Marsilio | A47F 7/024 248/178.1 |
| 7,909,521 B2 * | 3/2011 | Son | G03B 17/00 248/181.1 |
| 8,525,880 B2 | 9/2013 | DiPoala | |
| 9,301,412 B2 * | 3/2016 | Micko | H05K 5/0217 |
| 9,438,782 B2 | 9/2016 | Donaldson | |
| 2003/0007793 A1 | 1/2003 | Suzuki | |
| 2003/0142973 A1 | 7/2003 | Sawada | |
| 2004/0011936 A1 | 1/2004 | Cousin | |
| 2004/0037552 A1 | 2/2004 | Kajino et al. | |
| 2004/0178920 A1 | 9/2004 | Tews et al. | |
| 2005/0238345 A1 | 10/2005 | Hsieh | |
| 2005/0247845 A1 * | 11/2005 | Li | F16M 11/12 248/346.5 |
| 2007/0029456 A1 | 2/2007 | Mier-Langner et al. | |
| 2007/0053681 A1 | 3/2007 | Arbuckle | |
| 2007/0109407 A1 | 5/2007 | Thompson | |
| 2007/0154205 A1 | 7/2007 | Kocanda et al. | |
| 2007/0257995 A1 | 11/2007 | Horowitz et al. | |
| 2009/0096918 A1 | 4/2009 | Montelongo | |
| 2009/0196597 A1 * | 8/2009 | Messinger | F16M 11/14 396/427 |
| 2010/0033577 A1 | 2/2010 | Doak et al. | |
| 2010/0284682 A1 | 11/2010 | Chen | |
| 2011/0064401 A1 * | 3/2011 | Desorbo | G03B 17/00 396/419 |
| 2012/0092504 A1 | 4/2012 | Murphy | |
| 2012/0106942 A1 | 5/2012 | Mukai | |
| 2012/0106943 A1 | 5/2012 | Mukai | |
| 2012/0154521 A1 | 6/2012 | Townsend et al. | |
| 2012/0217356 A1 | 8/2012 | Park et al. | |
| 2012/0242788 A1 | 9/2012 | Chuang et al. | |
| 2015/0177596 A1 | 6/2015 | Bergsten et al. | |
| 2015/0286117 A1 * | 10/2015 | Sung | A42B 3/04 224/191 |
| 2015/0309395 A1 * | 10/2015 | Tomasewski | F16M 11/105 455/575.1 |
| 2015/0345698 A1 * | 12/2015 | Klamm | F16M 13/022 248/206.5 |
| 2016/0061380 A1 * | 3/2016 | Smith | F16M 13/022 248/558 |
| 2016/0138754 A1 * | 5/2016 | Li | F16M 13/022 248/206.5 |

FOREIGN PATENT DOCUMENTS

| | | |
|---|---|---|
| WO | 92 22172 | 12/1992 |
| WO | 2004095386 | 11/2004 |
| WO | 2009066988 | 5/2009 |

OTHER PUBLICATIONS

Aercont Vision Surround Video Series Installation Manual (downloaded Nov. 13, 2013).

EP 13 19 8392 European Search Report (dated May 6, 2014).

Vicki Hoffman, "Arecont Vision Debuts Innovative SurroundVideo Omni Cameras," Press Release, in|fusion Advertising, Sep. 24, 2013.

Security Products, "Innovative SurroundVideo: Omni cameras feature four multi-megapixel sensors," www.security-today.com, vol. 17, No. 11, Nov. 2013.

Profesional Security, "Multi-megapixel sensors," Oct. 24, 2013, retrieved from www.professionalsecurity.co.uk/products/cctv/multi-megapixel-sensors/.

AXIS Q60 Series Installation Guide, 26 pages, marked on last page with copyright notice "copyright Axis Communications AB, 2012" and with printing date "Printed: Oct. 2012." Accessed and downloaded in PDF format on Jan. 25, 2017 from www.archive.org website ("Wayback Machine") for website captures of the Axis Communications webside, www.axis.com, dated Dec. 15, 2012.

AXIS P33-VE Network Camera Series—Pendant Kit Installation Guide, 34 pages, copyright notice of "(c) Axis communications AB, 2009-2014" and a notation of "Printed: Feb. 2014" on the last page of the document. Accessed and downloaded in PDF format on Jan. 25, 2017 from www.archive.org website ("Wayback Machine") for website captures of the Arecont Vision webiste, www.arecontvision.com, dated Apr. 11, 2014.

"Concise Description of Asserted Relevance Accompanying Third Party Submission Pursuant to 35 U.S.C. 122(e) and 37 C.F.R. 1.290," filed in U.S. Appl. No. 15/226,816, concerning U.S. Pat. No. 4,080,629, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning U.S. Pat. No. 6,064,430, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning U.S. Pat. No. 6,354,749, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning U.S. Patent Publication 2012/0092504, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning U.S. Patent Application Publication No. 2015/0177596, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning European Patent No. 2077538, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning International Patent Application Publication No. WO2004/095386, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning Axis Q60 Series Installation Guide, submission dated Jan. 30, 2017.

"Concise Description of Asserted Relevance Accompanying Third Party Submission Pursuant to 35 U.S.C. 122(e) and 37 C.F.R. 1.290," filed in U.S. Appl. No. 15/226,816, concerning Axis P33-VE Network Camera Series—Pendant Kit Installation Guide, submission dated Jan. 30, 2017.

* cited by examiner

MONITORING DEVICE ARRANGEMENT

CROSS-REFERENCE TO RELATED APPLICATIONS

This application is a continuation of U.S. patent application Ser. No. 14/567,563, filed Dec. 11, 2014, which is incorporated herein by reference, which claims priority to European Patent Application No. 13198392.6, filed Dec. 19, 2013.

TECHNICAL FIELD

The present invention concerns a monitoring device arrangement comprising a mounting rail and at least two fixed monitoring devices mounted on holders arranged on said mounting rail.

BACKGROUND

Monitoring device arrangements may include a number of monitoring devices, such as cameras and IR detectors. The monitoring devices may be mounted on a support and may be used for monitoring an area around the monitoring device arrangement. The monitoring devices in such a monitoring device arrangement may all be of the same type, or they may be of different types. For instance, one monitoring device may be a fish-eye camera and another monitoring device may be a fix focus lens camera.

It may be desirable to monitor, e.g., a 360° field of view around the monitoring device arrangement. However, in some locations, there may be objects, such as walls, blocking the view of one or more of the monitoring devices, reducing the usable field of view of the monitoring device arrangement. Further, the most important parts of the scene to monitor may be located such that they are near the edge of the field of view of one of the monitoring devices, whereas it would be desirable to have these parts at the centre of the field of view. It would therefore be desirable to have a monitoring device arrangement allowing flexibility in the positioning of the monitoring devices.

SUMMARY OF THE INVENTION

It is an object of the present invention to provide a monitoring device arrangement which alleviates the problems associated with prior art monitoring device arrangements.

A particular object is to provide a monitoring device arrangement which enables flexible, yet well-defined positioning of monitoring devices.

According to the invention, these and other objects are achieved, in full or at least in part, by a monitoring device arrangement comprising a mounting rail, and at least two fixed monitoring devices, said fixed monitoring devices each being mounted on a respective holder, said holders being arranged on said mounting rail, wherein each said holder comprises a lock device locking said holder in a determined position on said mounting rail, and wherein said lock device is releasable to allow sliding repositioning of said holder on said mounting rail. It may be noted that the term "fixed monitoring device" refers to a monitoring device which is not in itself capable of panning or tilting, but which may be capable of zooming. With a monitoring device arrangement according to the invention, it is possible to mount fixed monitoring devices on the mounting rail with a possibility of adjusting the positions of the fixed monitoring device by sliding them along the mounting rail with the lock device released. Once the fixed monitoring devices have been placed in the desired position, the lock device of the holder may be locked, and the fixed monitoring devices may be securely held on the mounting rail. In this manner, the monitoring device arrangement is flexible in that the positions of the fixed monitoring devices in relation to each other or in relation to objects in the surroundings may be chosen in accordance with current needs. Thus, for instance, fixed monitoring devices may be positioned to cover a desired field of view and avoiding positions where the field of view of one or more of the fixed monitoring devices would be blocked by a wall or other object. Further, parts of a potential field of view which for other reasons should not be monitored may also be avoided. This may, e.g., be the case if a monitoring device arrangement is placed indoors, and it is not allowable to monitor persons outside, through a window. By adjusting the positions of the fixed monitoring devices on the mounting rail, their usable combined field of view may thus be utilised, instead of having to shut off an inappropriately directed fixed monitoring device. Conversely, there may be particularly important parts of the scene to monitor, and by adjusting the positions of the fixed monitoring devices on the mounting rail, the field of view may be centred on the most important parts of the scene.

In some embodiments, the mounting rail is arcuate or angled. Thereby, a wide range of positions for the fixed monitoring devices are available in order to cover a desired field of view. If the mounting rail is arcuate and is free from sharp angles, the holders may easily be slidingly repositioned along the entire arc portion.

The mounting rail may be circular. In this manner, the fixed monitoring devices may be positioned in a large number of positions along the circular mounting rail, thereby allowing a large combined field of view.

In an embodiment, the lock device of the holder comprises a magnet, and the mounting rail comprises ferromagnetic material. This is a practical way of achieving a releasable lock, which does not require tools for releasing and locking the holder.

The mounting rail may comprise at least one magnet, and said holder may comprise ferromagnetic material. This is also a practical way of achieving a releasable lock, which does not require tools for releasing and locking the holder.

In one embodiment, the holder comprises a biasing member biasing said holder against said mounting rail. In this manner, it may be ensured that the holder is securely held in position on the mounting rail.

The biasing member may comprise a leaf spring.

The mounting rail may have at least one recess or protrusion in a predetermined position along said mounting rail, and the biasing member may be adapted to engage said recess or protrusion for locking said holder in said predetermined position. This makes it easy for a person installing the monitoring device arrangement to place the fixed monitoring devices correctly in case one of the predetermined positions is desired. Similarly, this may assist in adjusting the position of the fixed monitoring devices in an already mounted monitoring device arrangement. For instance, the mounting rail may be provided with four recesses or protrusions in positions 90° apart along the mounting rail. This may simplify equidistant positioning of four fixed monitoring devices for a 360° field of view.

The holder may comprise a rotation prevention member preventing said holder from rotating around said mounting rail. This may ensure a stable positioning of the fixed monitoring device once the holder is locked in the desired position.

In one embodiment, the holder comprises a retaining member arranged to retain said holder on said mounting rail also when said lock device is released. Hereby, it may be ensured that the holder is retained on the rail even during a repositioning movement. It may also be ensured that the holder is retained on the mounting rail even if the locking function of the lock device were to fail for some reason.

The retaining member may comprise a hook retaining said holder on said mounting rail. This is a practical way of ensuring that the holder is kept on the mounting rail.

At least one of said fixed monitoring devices may be a fix focus lens camera. Further, at least one of said fixed monitoring devices may be a non-pannable, non-tiltable camera capable of zooming.

In an embodiment, the monitoring device arrangement further comprises a pannable and/or tiltable monitoring device, wherein the mounting rail is arranged surrounding said pannable and/or tiltable monitoring device. For instance, the fixed monitoring devices may be used for getting an overview and the pannable and/or tiltable monitoring device may be used for targeting objects found using the overview monitoring devices.

The monitoring device arrangement may further comprise a shielding portion arranged to shield said pannable and/or tiltable monitoring device from environmental factors, such as sunlight or rain. In this manner, the pannable and/or tiltable monitoring device may be protected from harmful environmental factors, such as ingress of rain. If the pannable and/or tiltable monitoring device is a camera, it may be advantageous to shield it from the sun in order to obtain good images.

The pannable and/or tiltable monitoring device may be a PTZ camera, i.e. a camera capable of panning, tilting and zooming. If the fixed monitoring devices are cameras, these may be used for getting an overview image of an area surrounding the monitoring device arrangement. The PTZ camera may be used for tracking and zooming in on objects found in the overview image. The overview image may be stitched together from the images captured by the respective fixed cameras to form a panoramic image. The overview may also be shown as separate images, e.g., on a video wall.

The monitoring device arrangement may comprise a motor for sliding repositioning of said holder on said mounting rail. In this manner, the positions of the fixed monitoring devices may be adjusted even if the monitoring device is difficult to reach, or if adjustment is needed also after installation of the monitoring device, e.g., for different monitoring needs during the day and at night. A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
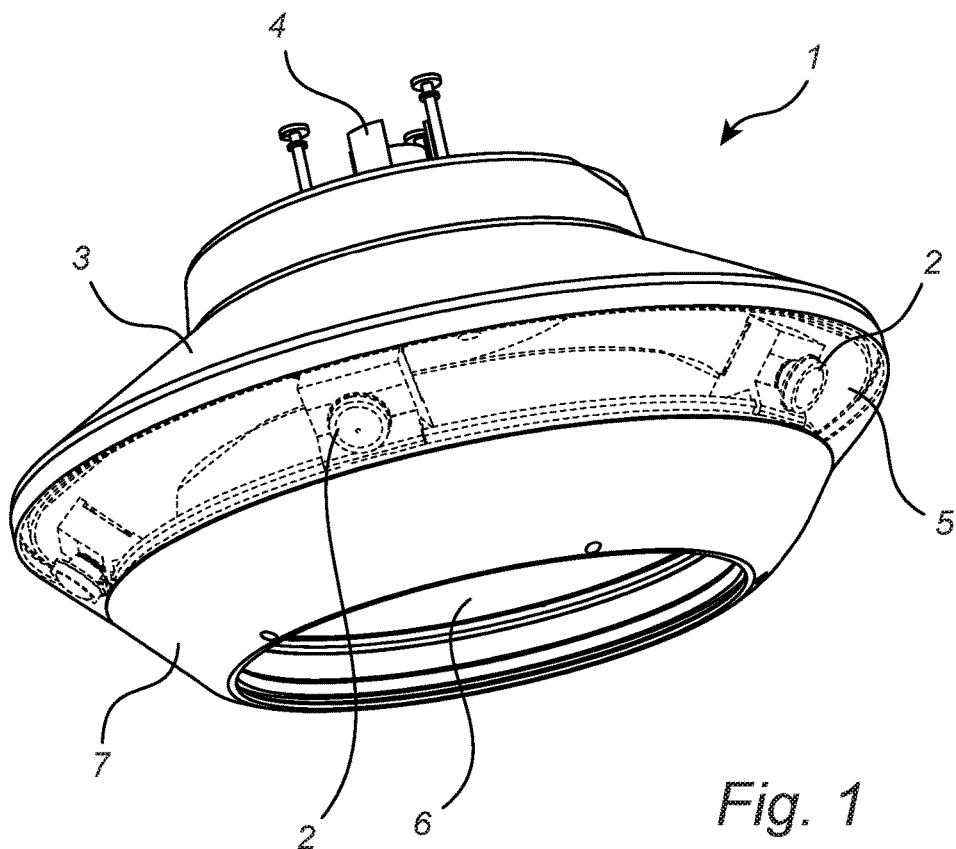
FIG. 1 is a perspective view of a monitoring device arrangement according to a first embodiment.

In FIG. 1 a monitoring device arrangement 1 is shown comprising a number of monitoring devices 2. In this embodiment, the arrangement is a camera arrangement comprising a number of fixed cameras, i.e. cameras that are in themselves incapable of panning and tilting. The camera arrangement 1 has a shielding portion 3 for shielding the fixed cameras 2 against environmental factors, such as sunlight, rain, and snow. Further, the camera arrangement 1 has an attachment portion 4 for attaching the camera arrangement to, e.g., a mounting bracket (not shown in FIG. 1) for mounting on a surface such as a wall, a ceiling, or a pole. The fixed cameras 2 are arranged inside a protective window 5. At an end, which in FIG. 1 is a lower end, of the camera arrangement, there is an opening 6 surrounded by a trim ring 7. The shielding portion 3 may be made of aluminum, making it allowable to arrange the camera arrangement recessed in a ceiling while fulfilling fire safety requirements.

Figure 2:
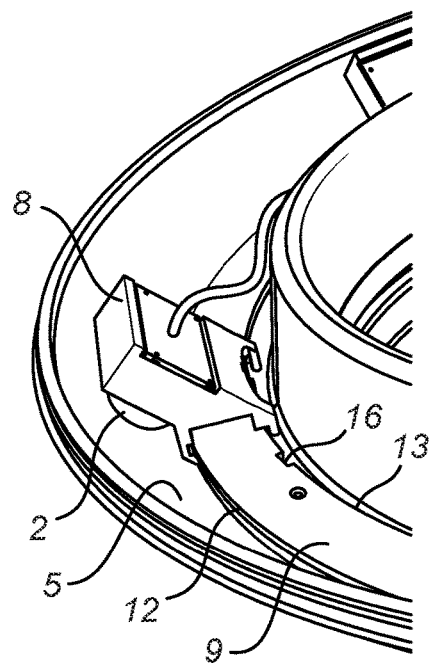
FIG. 2 is a perspective view of a detail in the monitoring device arrangement in FIG. 1 showing a monitoring device in a holder arranged on a mounting rail.

Turning to FIG. 2, a fixed camera 2 of the camera arrangement 1 may be seen. The fixed camera 2 is arranged in a holder 8, which is mounted on a mounting rail 9. In the embodiment shown, the mounting rail 9 is of circular shape, such that it surrounds the opening 6.

Figure 3:
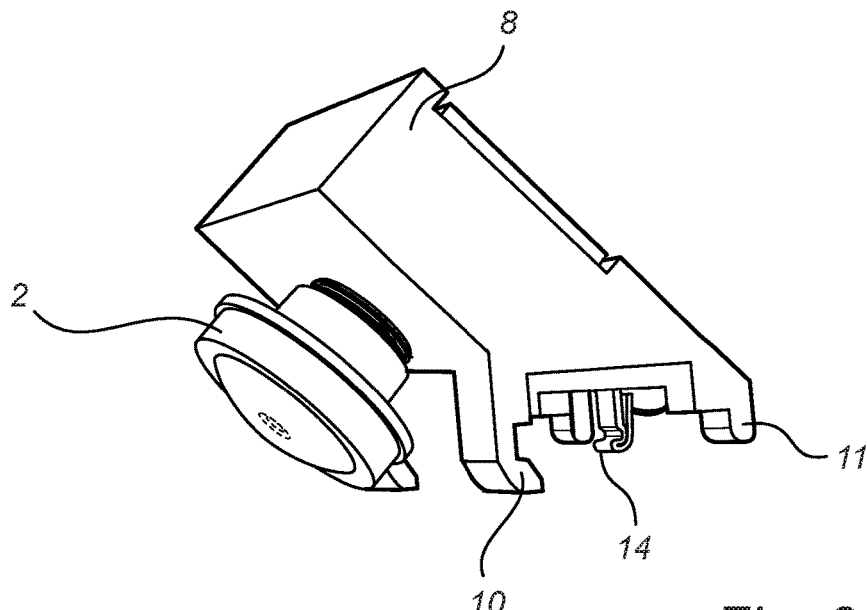
FIG. 3 is a perspective view of the monitoring device and the holder shown in FIG. 2.

As may be more clearly seen in FIG. 3, the holder 8 has a number of retaining members in the form of hooks 10 and bosses 11. The hooks 10 are arranged at the front of the holder 8, such that when the holder 8 is mounted on the mounting rail 9, the hooks 10 are engaged around a radially outer rim 12 of the mounting rail 9 (see FIGS. 2 and 4). The bosses 11 are arranged at the back of the holder 8, such that when the holder 8 is mounted on the mounting rail 9, the bosses 11 abut a radially inner rim 13 of the mounting rail 9, thereby preventing the holder 8 from tilting or rotating forwards. Further, the holder 8 has a biasing member in the form of a leaf spring 14 arranged at the back of the holder 8. The leaf spring 14 is slightly hook-shaped. When the holder 8 is mounted on the mounting rail 9, the leaf spring 14 urges the holder 8 radially outwardly against the inner rim 13 of the mounting rail 9 and the hook-shape engages the inner rim 13.

Figure 4:
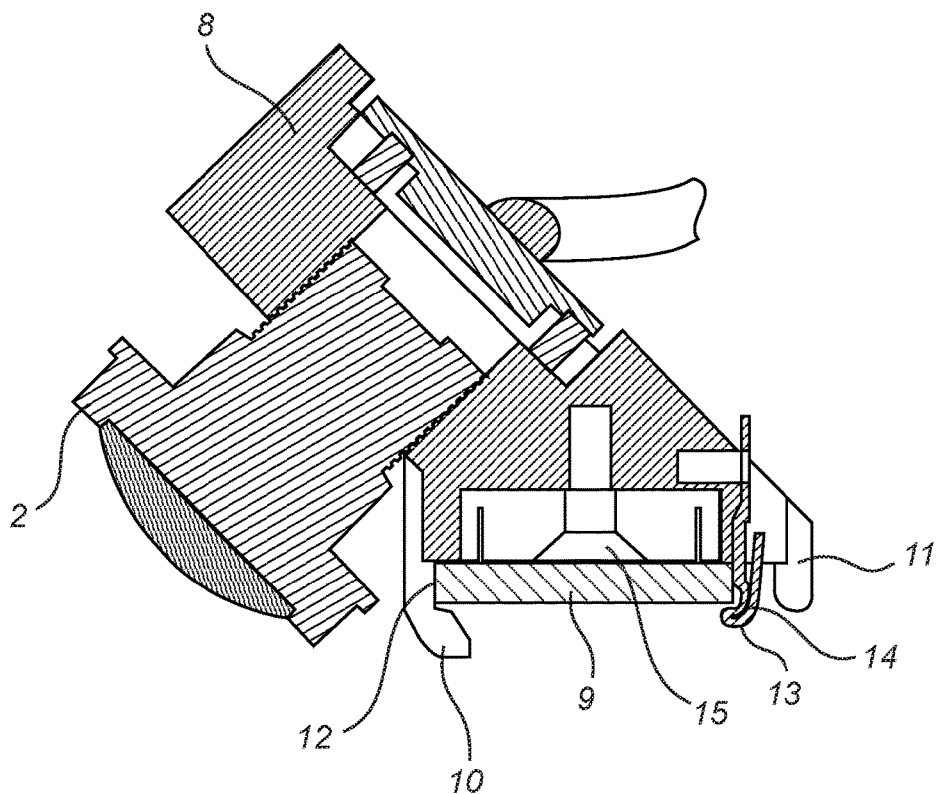
FIG. 4 is a sectional view of the monitoring device and holder of FIG. 3.

With reference to the cross-section shown in FIG. 4, the holder 8 has a locking device in the form of a magnet 15. In this embodiment, the mounting rail 9 is made of a ferromagnetic material, and the magnet may therefore securely lock the holder 8 in position on the mounting rail. By slightly lifting the holder 8 off the mounting rail 9, or by pressing back the leaf spring 14 and tilting the holder 8 slightly forward, the magnetic force of the magnet 15 may be overcome, such that the holder can be moved slidingly along the mounting rail 9 to a desired position. The hooks 10, bosses 11, and leaf spring 14 ensure that the holder is retained on the mounting rail 9 during this movement. Once the holder 8 has been moved to the desired position, the holder is released, such that the force of the magnet 15 locks the holder 8 in place. Thus, the holder 8 may be unlocked, moved, and locked without the need for tools.

As may be seen in FIG. 2, recesses or notches 16 are formed in the mounting rail 9 at predetermined positions. The holder 8 has a protrusion in the form of the leaf spring 14, which may engage the notch 16 when the holder is positioned in one of the predetermined positions. When a holder 8 is moved to one of the predetermined positions, the leaf spring 14 of the holder snaps into the corresponding notch 16. This snapping action of the leaf spring may be heard and/or felt by the person moving the holder 8, indicating that the fixed camera 2 and the holder 8 have reached the predetermined position. For instance, the mounting rail 9 may have four notches 16 spaced 90° apart, thereby simplifying mounting of four fixed cameras 2 at right angles for creating a combined 360° view.

Figure 5:
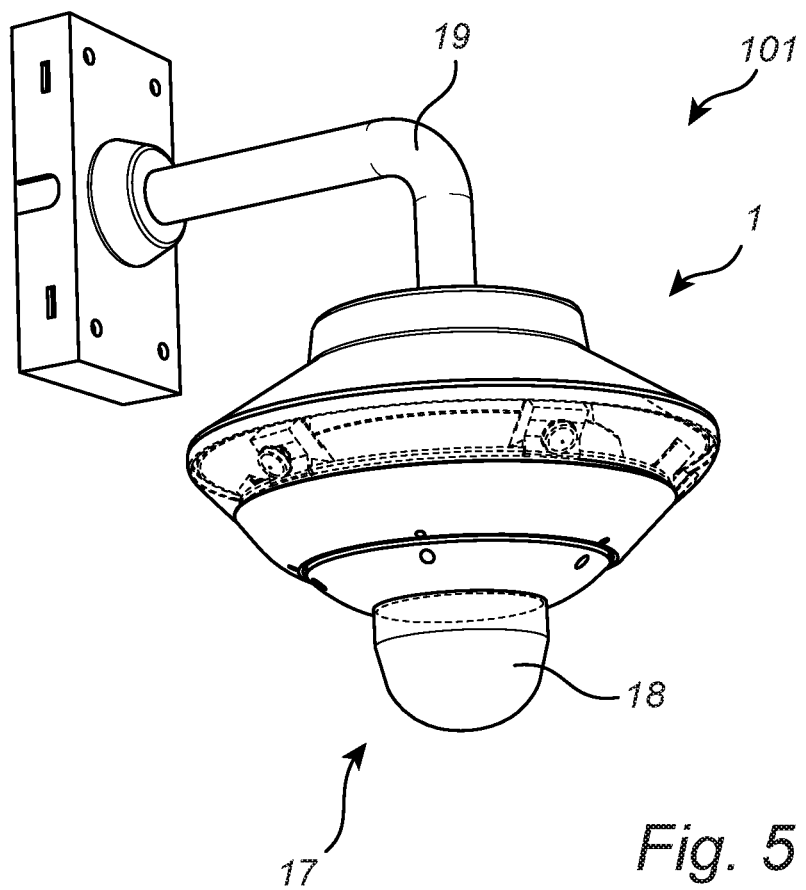
FIG. 5 is a perspective view of a monitoring device arrangement according to a second embodiment.
Figure 6:
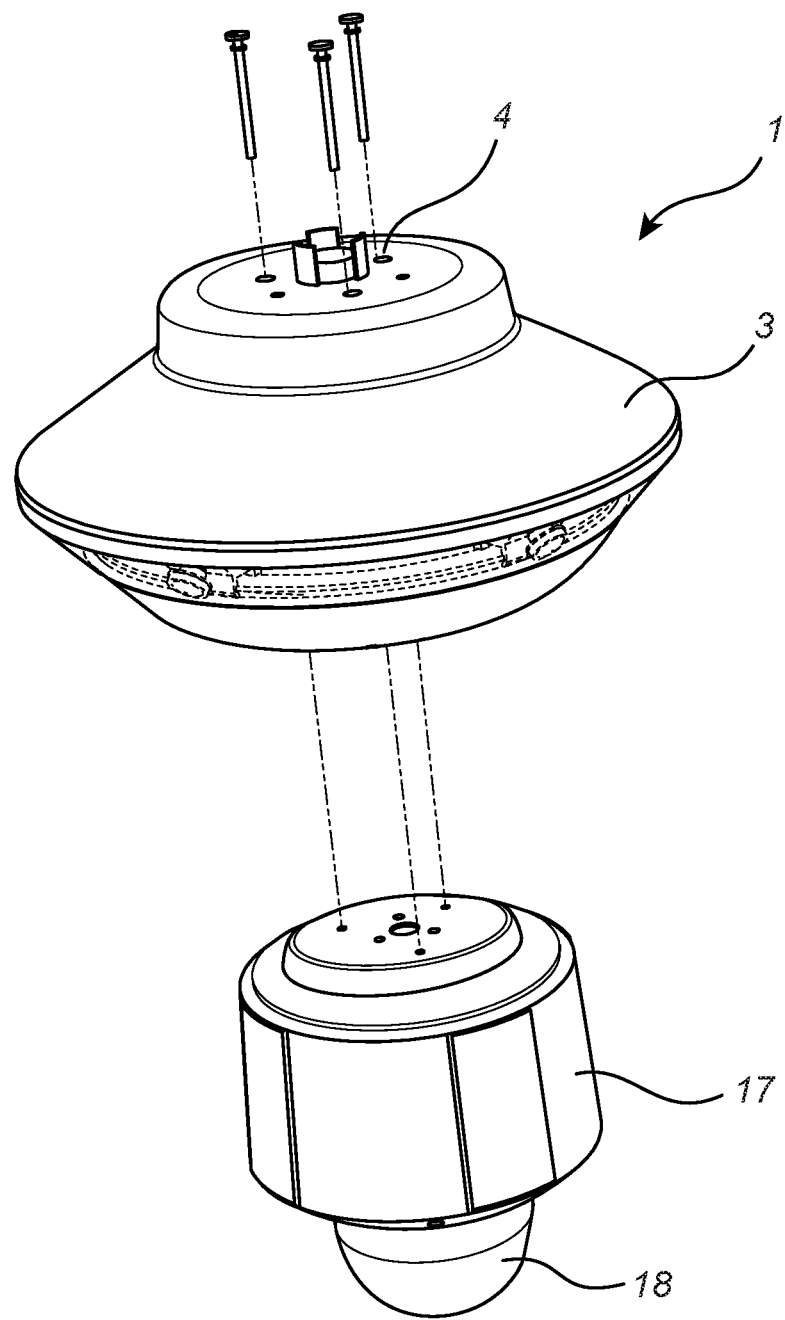
FIG. 6 is an exploded view of the monitoring device arrangement shown in FIG. 5.

Now turning to FIG. 5, the camera arrangement 1 may be used as an accessory for a pannable and/or tiltable camera 17. In such case, the pannable and/or tiltable camera 17 may be mounted inside the camera arrangement 1 with a dome 18 of the pannable and/or tiltable camera 17 protruding through the opening 6 of the camera arrangement 1. The combination of the camera arrangement 1 and the pannable and/or tiltable camera 18 may be mounted to, e.g., a wall using a mounting bracket 19, which may be attached via the attachment portion 4 of the camera arrangement 1. When the accessory 1 and the pannable and/or tiltable camera 17 are assembled to a combined camera arrangement 101, the shielding portion 3 may shield the pannable and/or tiltable camera 17 from sun, rain, snow, and other potentially harmful environmental factors.

The fixed cameras 2 may be fix focus lens cameras, and the pannable and/or tiltable camera 17 may be a PTZ camera, i.e. a camera capable of panning, tilting and zooming. The fix focus lens cameras 2 may be used for creating an overview image of an area surrounding the combined camera arrangement 101. If, for instance, four fixed cameras 2 are placed approximately 90° apart on the mounting rail 9, a 360° view may be achieved. Depending on the viewing angle of the fixed cameras, a 360° view may be achieved with fewer cameras, for instance three fixed cameras 2 placed approximately 120° apart. When using the combined camera arrangement 101, the PTZ camera 17 may be directed to points of interest identified in the overview image created by the fixed cameras 2. Hereby, objects or persons may be tracked throughout the area covered by the cameras 2, 17 of the combined camera arrangement 101, while still maintaining an overview of the area.

When mounting the combined camera arrangement 101, the environment surrounding the combined camera arrangement 101 may be such that one or more of the fixed cameras would have all or parts of the field of view blocked by objects, such as building walls. In such case, the predetermined positions of the fixed cameras 2 may not be suitable. However, the holders 2 allow the fixed cameras 2 to be moved to more suitable positions along the mounting rail 9. Should, for instance, one of the predetermined positions on the mounting rail 9 entail that one of the fixed cameras be pointing into a wall, the fixed cameras may be moved closer together along the remaining portion of the mounting rail, such that they provide more overlap in the usable field of view surrounding the combined camera arrangement. Similarly, should the camera arrangement 101 be placed indoors, it might not be allowable to monitor persons walking past outside a window. Also in this type of situation, it may be desirable to adjust the positions of the fixed cameras 2 so as not to monitor a certain part of the surrounding area, but to use the fixed cameras 2 to get good coverage of the remaining surrounding area.

It will be appreciated that a person skilled in the art can modify the above described embodiments in many ways and still use the advantages of the invention as shown in the embodiments above. As an example, although reference has here been made to monitoring devices in the form of cameras, other monitoring devices may be used instead. Examples of such monitoring devices include IR detectors and microphones.

Instead of, or in combination with, cameras employing visible light, the cameras of the combined camera arrangement may comprise IR cameras, or thermal cameras.

The fixed monitoring devices need not necessarily each contain their own electronics. Instead, the electronics necessary for the two or more fixed monitoring devices may be arranged at one, common location.

In the embodiment described above, there are four fixed monitoring devices. However, another number of fixed monitoring devices may be arranged in the camera arrangement. Depending on the local conditions in the place where the monitoring device arrangement is mounted, it may be possible to create a desired overview with three, or as few as two fixed monitoring devices. In other instances, it may be desirable to have more than four fixed monitoring devices. For instance, a combination of a number of fixed cameras and other monitoring devices may be arranged on the mounting rail.

When the camera arrangement has been mounted, it may be possible to supplement it with more monitoring devices.

The monitoring devices may be removable from the holders, allowing exchange of monitoring devices for maintenance or for changing from one type of monitoring device to another.

In the embodiment described above, the fixed cameras are fix focus lens cameras, but cameras capable of zooming may be used instead.

The number of recesses or notches in the mounting rail need not necessarily be three or four. A smaller or larger number of recesses may be provided depending on the number of predetermined positions to mark. Further, the predetermined positions may be marked by recesses of other shapes than the notch shown in FIG. 2, such as through holes and blind holes.

The mounting rail and the holders, respectively, may be formed such that locking of the holders is only possible in the predetermined positions. They may be achieved, e.g., by suitable shapes of the recesses and protrusions. However, generally, it is preferable to allow an infinitely variable positioning of the holders on the mounting rail.

Instead of the recesses, the mounting rail may be provided with protrusions marking the predetermined positions. In such case, the holder may be provided with a corresponding recess for engagement with the protrusions.

In the embodiment shown in FIG. 5, a PTZ camera is placed in the opening of the camera arrangement. However, the pannable and/or tiltable monitoring device may be another kind of camera or monitoring device. The camera arrangement may in some instances be mounted without a central, pannable and/or tiltable monitoring device. For example, a spotlight or loudspeaker may be mounted in the opening. In some instances it may even be desirable to have no other device in the opening of the camera arrangement. In such case, the opening may be covered by a lid.

The magnet may be a permanent magnet, e.g., a neodymium magnet. In one embodiment, the magnet may have two magnetic poles and be pivotable, such that it locks the holder in place when oriented in one direction, and releases the holder oriented in the opposite direction.

Instead of permanent magnets, electro-magnets may be used. In such case, it is preferable if the action of the electro-magnet be arranged such that when the monitoring device is supplied with electric current, the electro-magnet is turned off, and such that it is turned on when the electric power supply is interrupted. Thereby, the fixed monitoring devices are locked securely in position in the case of a power outage.

The arrangement of the magnet and the ferromagnetic material may be reversed, such that each holder comprises ferromagnetic material, and the mounting rail comprises magnets. The ferromagnetic material used in the mounting rail or in the holder may be martensitic stainless steel, but other ferromagnetic materials are also possible.

Instead of lock devices employing magnets, the holders in the monitoring device arrangement may have lock devices employing other means. For instance, each holder may be provided with a spring or a snap lock. Examples of additional embodiments of holders are shown in FIGS. 7-9.

Figure 7:
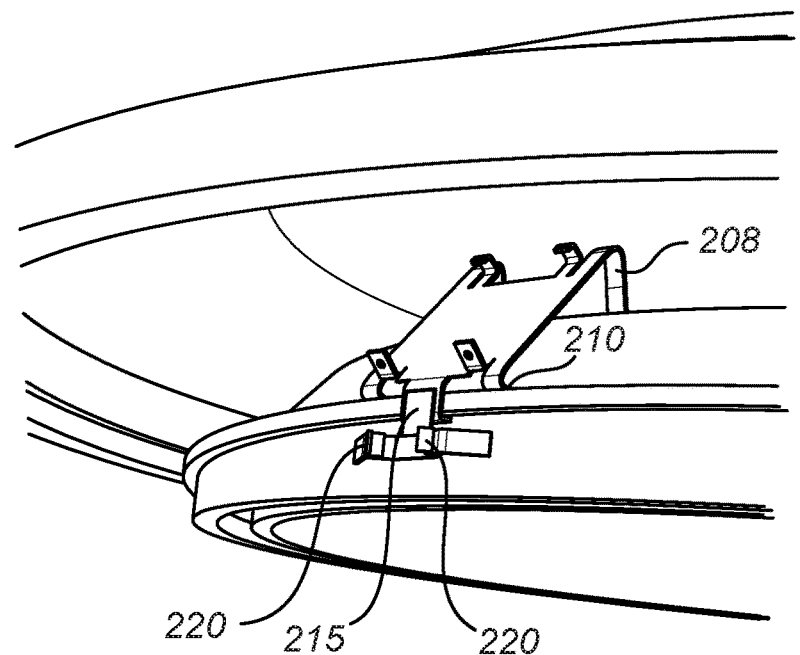
FIG. 7 is a perspective view of part of a monitoring device arrangement with a holder according to a third embodiment.

In FIG. 7, a lock device 215 of a holder 208 employing spring function is shown. The lock device 215 is essentially made up of bent sheet metal. At the front of the lock device 215, i.e. the part of the lock device 215 which is arranged at the radially outer rim of the mounting rail, the lock device 215 has two release tabs 220. By pressing the release tabs 220 towards each other, the lock device 215 is released, such that the holder 208 may be moved slidingly along the mounting rail to a desired position. Similar to the embodiment described above in connection with, e.g., FIG. 3, this holder 208 has hooks 210 for retaining the holder 208 on the mounting rail even when the lock device 215 is released.

Figure 8:
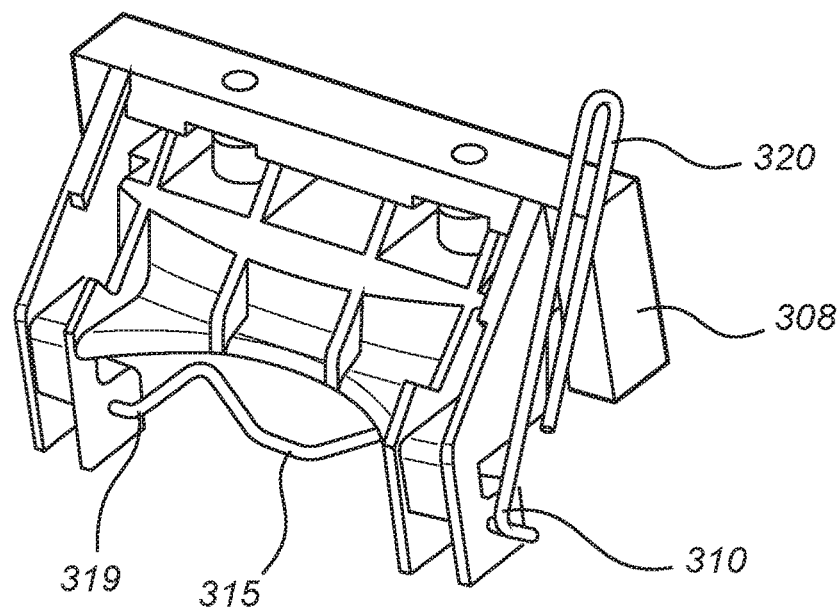
FIG. 8 is a perspective view of a holder according to a fourth embodiment.

In FIG. 8, another embodiment of a holder 308 having a lock device 315 employing a snap lock is shown. This holder 308 is essentially made of plastic, and the lock device 315 comprises a curved metallic bar 319 which is connected to a lock lever 320. Similar to the embodiments already described, the holder 308 in FIG. 8 has hooks 310 for retaining the holder 308 on the mounting rail, even when the lock device 315 is released. In the locked position, as shown in FIG. 8, the lock lever 320 positions the curved bar in a position where it presses against the underside of the mounting rail, thereby locking the holder 308 in position on the mounting rail. When the lock lever 320 is pivoted forwards, i.e. in a direction radially outwardly, the curved bar 319 is rotated such that it no longer presses against the mounting rail. The holder 308 may then be moved slidingly along the mounting rail.

Figure 9:
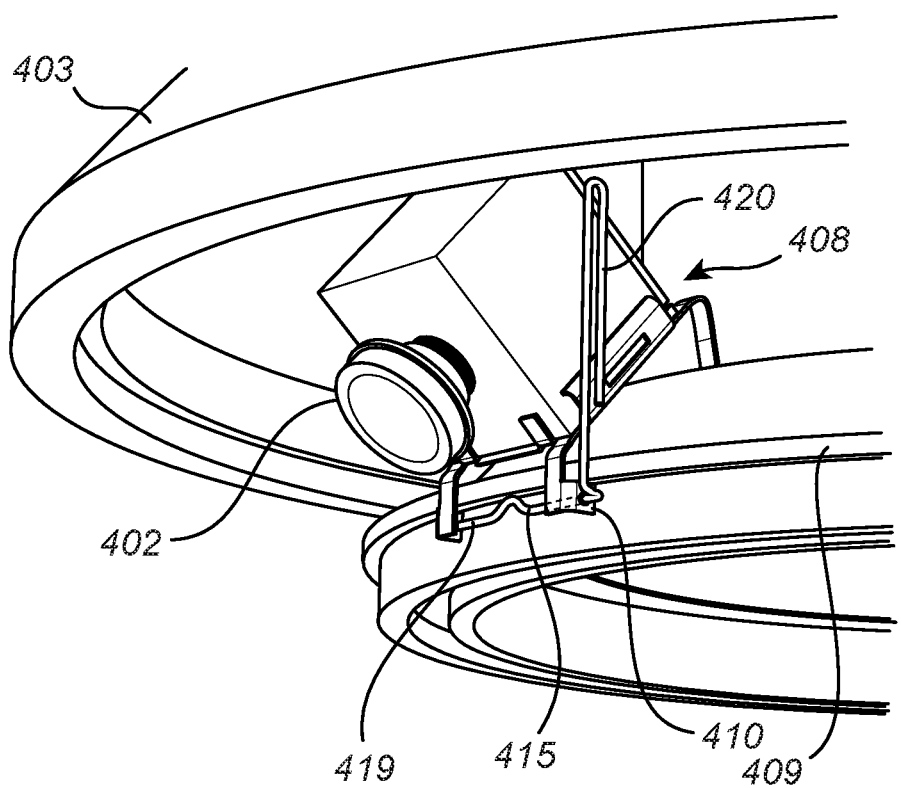
FIG. 9 is a perspective view of part of a monitoring device arrangement with a holder according to a fifth embodiment.

As may be seen in FIG. 9, combinations of features of the different embodiments of holders that have been described are also possible. Here, the holder 408 is of a type similar to the one shown in FIG. 7, and may be made essentially of sheet metal. However, the lock device 415 is of the type shown in FIG. 8, comprising a curved metallic bar 419 and a lock lever 420. In FIG. 9, the holder 408 is shown with the lock lever 420 in the locking position, in which the curved bar presses against the mounting rail 409. Thus, the holder 408 and the fixed camera 402 are held securely in position on the mounting rail. If the lock lever 420 is pivoted forwards, i.e. radially outwardly, the lock device 415 is released in the same way as described in connection with FIG. 8. With the lock device 415 released, the holder 408 with the fixed camera 402 may be moved along the mounting rail 409 to a desired position in a sliding motion. The lock lever 420 may be made long enough to protrude radially outside the outer rim of the mounting rail 409 such that it prevents replacing the protective window (not shown in FIG. 9) when in the unlocked position. In this manner, it may be ensured that a person installing the monitoring device arrangement does not accidentally forget to lock the locking device 415 before closing the monitoring device arrangement. Once the arrangement is locked and closed, the fixed cameras 402 are held securely in place on the mounting rail 409, protected by the shielding portion 403 and the protective window.

Other types of locking devices are also possible, such as locking devices employing rubber bands, clamping screws or tension bolts. Advantageously, locking devices not requiring tools for locking and releasing are used, thereby simplifying installation and adjustment of the monitoring device arrangement.

In the embodiments shown, the holders are intended to be moved manually along the mounting rail. However, there may be situations where it is useful to be able to move the holders by remote control. This could be of interest if the monitoring device arrangement is mounted in a location that is difficult to reach, e.g., high up on a wall or pole. A remote-controlled movement of the holders may be achieved using a toothed rim on the mounting rail. The inner rim or the outer rim or both rims of the mounting rail could be provided with teeth, and the holder be provided with corresponding teeth. A motor, such as a piezoelectric motor, could be provided in the holder for moving the holder along the toothed mounting rail. It should be noted that the manual as well as the remote-controlled movement of the holders are intended for installation and adjustment of the fixed monitoring devices, and not for any movement during the actual monitoring. Thus, once the fixed monitoring devices have been placed in the desired positions, they are intended to be securely held in position. Remote-controlled or motorised movement of the fixed monitoring devices may also be useful for setting personal preferences, such as the preferences of different security guards. For instance, the monitoring needs may be different during the day and at night, such that a security guard on a day shift wishes to centre the field of view of one of the fixed monitoring devices on one part of the surrounding area, while a security guard working on a night shift may wish to centre the field of view on another part.

The holders may be arranged such that the monitoring devices are fixedly attached in the holders, allowing removal only in a workshop.

A monitoring device arrangement, such as the one shown in FIGS. 1-4, may be manufactured and sold separately as an accessory to a pannable and/or tiltable monitoring device. Hereby, an existing pannable and/or tiltable monitoring device may be upgraded by providing it with the accessory, and without any real modification of the pannable and/or tiltable monitoring device. The monitoring device arrangement may also be manufactured already combined, such that it includes the fixed monitoring devices arranged on the mounting rail, and the pannable and/or tiltable monitoring device arranged in the opening of the monitoring device arrangement.

In the embodiments shown, the mounting rail is circular. However, other shapes are also possible. In some embodiments, the mounting rail may be elliptical. The mounting rail may have an arcuate shape, although not forming a full circle or ellipse. In other embodiments, the mounting rail may be angled, having straight portions along which the holders are movable. It is also possible to combine arcuate and straight portions along the mounting rail. For mounting close to a wall, it may for instance be sufficient to have a semicircular mounting rail, allowing positioning of fixed monitoring devices only in positions not facing the wall. It may also be useful to have a mounting rail resembling a semicircle, but made up of three straight portions placed at angles of, e.g., 120°.

Thus, the invention should not be limited to the shown embodiments but should only be defined by the appended claims.

The invention claimed is:

1. A monitoring device arrangement comprising:
a mounting surface having a finite number of predetermined positions,
wherein the mounting surface includes an outer rim that is circular,
wherein the finite number of predetermined positions is greater than four,
wherein each of the predetermined positions is configured to position a camera for monitoring, and
wherein each of the predetermined positions on the mounting surface is associated with a hole in the mounting surface
a plurality of cameras; and
a plurality of holders,
wherein each of the plurality of cameras is mounted on a respective one of the holders arranged on the mounting surface;
wherein each of the holders comprises a lock device to secure the respective holder in a first one of the predetermined positions on the mounting surface or in a second one of predetermined positions on the mounting surface,
wherein the first one of the predetermined positions is different than the second one of the predetermined positions on the mounting surface,
wherein the lock device is releasable to allow the respective holder to be repositioned on the mounting surface from the first one of the predetermined positions on the mounting surface to the second one of the predetermined positions on the mounting surface,
wherein the lock device includes a screw to secure the respective holder on the mounting surface,
wherein each of the holders comprises a magnet and the mounting surface comprises ferromagnetic material, wherein magnetic force between the respective magnet and the mounting surface secures the respective holder to the mounting surface, and
wherein each of the holders includes a protrusion configured to engage the hole in the mounting surface to provide tactile feedback when the respective holder reaches the second one of the predetermined positions on the mounting surface.

2. The monitoring device arrangement according to claim 1, wherein the holders are configured to be manually moved, during installation of the monitoring device arrangement, so as to change fields of view of the plurality of cameras, and wherein the holders are configured to fix the plurality of cameras, so as to prevent movement, during monitoring.

3. The monitoring device arrangement according to claim 1, further comprising:
a spring configured to provide tactile feedback when the respective holder reaches the second one of the predetermined positions on the mounting surface.

4. The monitoring device arrangement according to claim 1, wherein the lock device includes the magnet.

5. The monitoring device arrangement according to claim 1, wherein one of the holes is a blind hole.

6. The monitoring device arrangement according to claim 1, wherein at least one of the holders comprises a retaining member arranged to retain the holder on said mounting surface when the lock device is released.

7. The monitoring device arrangement according to claim 1, wherein at least one of the plurality of cameras is a fix focus lens camera.

8. The monitoring device arrangement of claim 1,
wherein the respective holder is configured to slide on the mounting surface from the first one of the predetermined positions to the second one of the predetermined positions.

9. The monitoring device arrangement of claim 8,
wherein, when the magnetic force is manually overcome, the respective holder is configured to slide on the mounting surface from the first one of the predetermined positions to the second one of the predetermined positions.

10. The monitoring device arrangement of claim 2, wherein the plurality of cameras are incapable of panning and tilting during monitoring.

11. The monitoring device arrangement of claim 2,
wherein the plurality of cameras include a first camera with a first field of view and a second camera with a second field of view, and
wherein the predetermined positions are configured to allow the first camera and the second camera to be manually moved to be closer to each other to increase overlap of the first field of view and the second field of view.

12. A monitoring device arrangement comprising:
a mounting surface having a finite number of predetermined positions,
wherein the mounting surface includes an outer rim that is arcuate,
wherein the finite number of predetermined positions is greater than four,
wherein each of the predetermined positions is configured to position a monitoring device, and
wherein each of the predetermined positions on the mounting surface is associated with a hole, a recess, or a protrusion in or on the mounting surface;
a plurality of monitoring devices; and
a plurality of holders, wherein each of the plurality of monitoring devices is mounted on a respective one of the holders arranged on the mounting surface;

wherein each of the holders comprises a lock device to secure the respective holder in a first one of the predetermined positions on the mounting surface or in a second one of predetermined positions on the mounting surface, wherein the first one of the predetermined positions is different than the second one of the predetermined positions on the mounting surface, wherein the lock device is releasable to allow the respective holder to be repositioned on the mounting surface from the first one of the predetermined positions to the second one of the predetermined positions on the mounting surface, wherein one of the holders comprises a magnet and the mounting surface comprises ferromagnetic material, wherein magnetic force between the respective magnet and the mounting surface secures the respective holder to the mounting surface.

13. The monitoring device arrangement according to claim 12, wherein the monitoring devices are cameras, wherein the holders are configured to be manually moved, during installation of the monitoring device arrangement, so as to change fields of view of the cameras, and wherein the holders are configured to fix the cameras, so as to prevent movement, during monitoring.

14. The monitoring device arrangement according to claim 12, wherein each lock device includes the magnet.

15. The monitoring device arrangement of claim 12, wherein the respective holder is configured to slide on the mounting surface from the first one of the predetermined positions to the second one of the predetermined positions.

16. The monitoring device arrangement of claim 15, wherein, when the magnetic force is manually overcome, the holder is configured to slide on the mounting surface from the first one of the predetermined positions to the second one of the predetermined positions.

17. The monitoring device arrangement of claim 12, wherein the outer rim is circular.

18. The monitoring device arrangement of claim 12, wherein the monitoring devices are cameras, infra-red (IR) detectors, or microphones, wherein the holders are configured to be manually moved, during installation of the monitoring device arrangement, so as to change direction of monitoring, and wherein the holders are configured to fix the monitoring devices, so as to prevent movement, during monitoring.

19. A monitoring device arrangement comprising:

a mounting surface having a finite number of predetermined positions, wherein the mounting surface includes an outer rim that is arcuate,
  wherein the finite number of predetermined positions is greater than four,
  wherein each of the predetermined positions is configured to position a monitoring device for monitoring, and
  wherein each of the predetermined positions on the mounting surface is associated with a hole, a recess, or a protrusion in or on the mounting surface;

a plurality of monitoring devices; and a plurality of holders,
  wherein each of the plurality of monitoring devices is mounted on a respective one of the holders arranged on the mounting surface;
  wherein each of the holders comprises a lock device to secure the respective holder in a first one of the predetermined positions on the mounting surface or in a second one of predetermined positions on the mounting surface,
  wherein the first one of the predetermined positions is different than the second one of the predetermined positions on the mounting surface,
  wherein the lock device is releasable to allow the respective holder to be repositioned on the mounting surface from the first one of the predetermined positions to the second one of the predetermined positions on the mounting surface, and
  wherein each of the holders includes a protrusion configured to engage the hole, recess, or protrusion in the mounting surface to provide tactile feedback when the respective holder reaches the second one of the predetermined positions on the mounting surface.

20. The monitoring device arrangement according to claim 19, wherein the monitoring devices are cameras, wherein the holders are configured to be manually moved, during installation of the monitoring device arrangement, so as to change fields of view of the cameras, and wherein the holders are configured to fix the cameras, so as to prevent movement, during monitoring.

* * * * *